United States Patent [19]
Fischbach

[11] Patent Number: 5,110,175
[45] Date of Patent: May 5, 1992

[54] CONVERTIBLE WITH AUTOMATIC WINDOW OPERATION

[75] Inventor: Roderick C. Fischbach, Ann Arbor, Mich.

[73] Assignee: Wickes Manufacturing Company, Southfield, Mich.

[21] Appl. No.: 736,607

[22] Filed: Jul. 26, 1991

[51] Int. Cl.$^5$ .................................................. B60J 7/00
[52] U.S. Cl. ...................... 296/117; 296/146; 60/420; 49/324
[58] Field of Search ............... 296/117, 116, 107, 146; 60/420; 91/459, 527; 49/324, 280

[56] References Cited

U.S. PATENT DOCUMENTS

| | | | |
|---|---|---|---|
| 2,667,380 | 1/1954 | Parsons | 296/117 |
| 2,696,403 | 12/1954 | Baugh | 296/44 |
| 2,704,226 | 3/1955 | Orr | 296/117 |
| 2,913,876 | 11/1959 | Reid | 60/52 |
| 3,251,625 | 5/1966 | Adamski | 296/117 |
| 3,312,058 | 4/1967 | Shelhart | 60/420 |
| 3,394,962 | 7/1968 | Adamski | 296/117 |

*Primary Examiner*—Robert R. Song
*Attorney, Agent, or Firm*—David A. Greenlee

[57] ABSTRACT

A convertible vehicle has a body with a passenger compartment, a pair of passenger access doors each having a window and a pair of rear quarter windows, all mounted on the body for movement between raised and lowered positions. A folding top is mounted on the body for movement between a raised position covering the passenger compartment and a lowered position opening the passenger compartment. A hydraulic system includes a hydraulic pump, two hydraulic top actuators for raising and lowering the top, and a pair of hydraulic window actuators operatively connected to the quarter windows for raising and lowering the windows with less pressure than required to raise and lower the top. A hydraulic circuit connects all of the cylinders in parallel which enables sequential operation of the windows and then the top. A three-position control switch enables the windows to be lowered and raised when the top is in raised or lowered position by moving the control to respective "down" and "up" positions. The windows are hydraulically locked in any selected position by actuation of a solenoid valve when the control is moved to "off" position. In another embodiment the hydraulic system includes actuators for the door windows. This embodiment features many possible sequences of operation of the windows.

17 Claims, 3 Drawing Sheets

CONVERTIBLE WITH AUTOMATIC WINDOW OPERATION

BACKGROUND OF THE INVENTION

This invention relates generally to convertible vehicles and, more particularly, to power operation of the windows of a convertible vehicle.

In its simplest form, a convertible vehicle has a manual top comprising a fabric-covered articulated linkage that is manually folded and unfolded to lower and raise the top. The vehicle includes two door-mounted side windows and, often, two body-mounted rear quarter windows, all of which are manually raised and lowered independent of top operation.

To simplify operation, most convertibles currently in production have power tops which are operated by a pair of reversible hydraulic cylinders. Window operation is simplified by providing electrical operators for each of lower all four windows together. These operators usually comprise individual electric motors that connect through gearing to the window lift mechanism. A switch is an adjacent panel; in addition a duplicate switch is provided near the driver's window to enable simultaneous operation of all windows.

Thus, to completely close an open passenger compartment, a vehicle driver must manipulate a top control switch and four window control switches. Reverse operation to open a closed passenger compartment requires reverse operation of all five control switches.

Thus, a conventional full power convertible vehicle requires four electric motors for the windows, seven separate switches (one at each window, plus three duplicate window switches for the driver) for operating these motors. In addition, a hydraulic system for operating the top comprises an electric motor driven pump, a pair of cylinders for operating the top, and a control switch, for a total.

It would be desirable to reduce the complexity of the conventional power window and top arrangement for convertible vehicles.

SUMMARY OF THE INVENTION

It is therefore an object of this invention to reduce the complexity of the conventional power window and top arrangement for convertible vehicles.

Accordingly, in one aspect, this invention features a convertible vehicle having a body with a passenger compartment, a top mounted on the body for movement between a raised position covering the passenger compartment and a lowered position opening the passenger compartment, and a window mounted on the body for movement between a raised position and a lowered position. A hydraulic system including a first hydraulic actuator is provided for includes a second hydraulic actuator operatively connected to the window for raising and lowering the window with less pressure than required to raise and lower the top. A hydraulic circuit connects the actuators in parallel so that the hydraulic system is operable to sequentially raise the window and then the top, and to sequentially lower the window and then the top.

In another aspect, this invention features a convertible vehicle having a body with a passenger compartment, a top mounted on the body for movement between lowered position opening the passenger compartment, and lock means for locking the top in raised position A hydraulic system including a hydraulic pressure fluid source and a hydraulic top actuator is provided for raising and lowering the top. Two windows are each mounted on the body for movement between raised position and lowered positions. The hydraulic system further includes a hydraulic window actuator operatively connected to each of the windows. The actuators are operable to raise and lower the windows with less pressure than required to raise and lower the top. A hydraulic circuit connects the actuators in parallel to the pressure fluid source so that the hydraulic system is operable to sequentially raise the windows and then the top, and to sequentially lower the windows and then the top.

Yet another feature of this invention is the provision of valve means selectively operable to hydraulically isolate the window actuators from the pressure fluid source to prevent movement of the windows.

Still another feature of this invention is that the valve means have a first position in which movement of the windows is prevented by hydraulically isolating the window actuators from the pressure fluid source and a second position which enables movement of the windows by connecting the window actuators with the pressure fluid source. The hydraulic system further includes a control having three positions: an "up" position for moving the valve means to second position and operating the pressure fluid source to raise the windows and top; an "off" position for moving the valve means to first position and halting operation of the pressure fluid source; and a "down" position for moving the valve means to second position and operating the pressure fluid source to lower lowered and raised when the top is locked in raised position by moving the control to respective "down" and selected position when the control is moved to "off" position.

A further feature of this invention is that the vehicle has two movable rear quarter windows mounted rearwardly of the doors. A hydraulic window actuator is operatively connected to each of the rear quarter windows to raise and lower the windows with less pressure than required to raise and lower the top. The hydraulic circuit connects all of the actuators in parallel to the pressure fluid source so that the hydraulic system is operable to sequentially raise all four windows and then the top, and to sequentially lower all four windows and then the top.

A yet further feature of this invention is hydraulic window actuators are additionally provided for each of the door windows and are operable to lower the windows with less pressure than required to raise and lower the top. The hydraulic circuit connects all of the actuators in parallel to the pressure fluid source so that the hydraulic system is operable to sequentially raise all four windows and then the top, and to sequentially lower all four windows and then the top. The window cylinders are relatively sized to effect a desired sequence of window operation.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
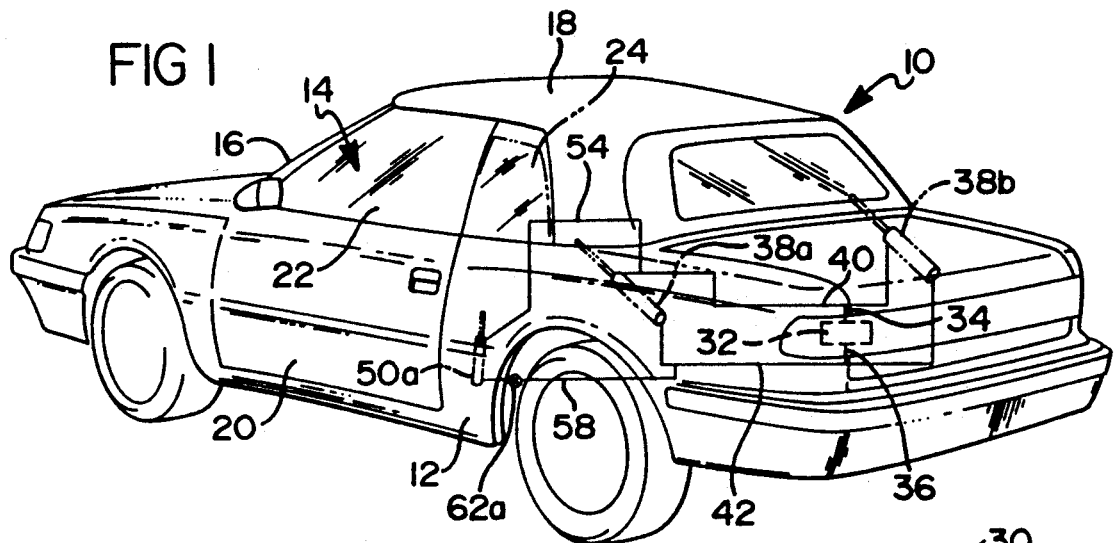
FIG. 1 is a perspective view of a convertible vehicle incorporating a hydraulic system according to this invention.

Referring now to FIG. 1, a convertible vehicle 10 includes a body 12 that encloses a passenger compartment 14 adjacent a windshield 16. A folding convertible top 18 comprises a conventional fabric-covered articulated frame and is selectively movable between a raised, unfolded position and a lowered, folded position to close or open passenger compartment 14 in a well-known manner. In its raised position, top 18 is latched to windshield 16 by a pair of conventional latches, not shown, such as those disclosed in U.S. Pat. No. 3,216,763 to Heincelman.

A pair of conventional side doors 20, only the left of which is shown, provide passenger access to compartment 14. Windows 22 (only left window shown) are provided in doors 20 for raising and lowering by conventional power operators, not shown. Rearwardly of windows 22, conventional rear quarter windows 24 (only left window shown) are mounted on the body for raising and lowering within body 12 as will be later described.

Figure 2:
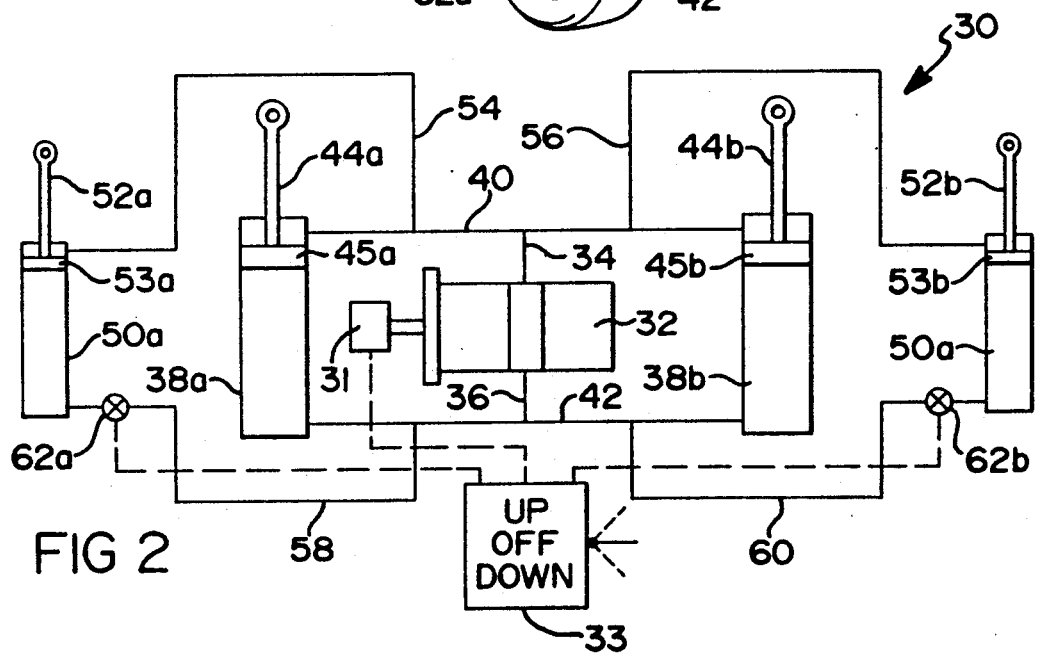
FIG. 2 is a schematic view of a hydraulic system for operating the top and the rear quarter windows of the vehicle of FIG. 1.

Referring additionally to FIG. 2, a hydraulic system 30 is provided for operating the top 18 and quarter windows 24 in the following manner. The hydraulic system 30 includes a hydraulic pressure fluid source comprising an electric motor which drives a reversible hydraulic pump 32. The flow of pressurized hydraulic fluid is controlled by manipulation of a control switch 33 which is located in passenger compartment 14 and has "up", "down" and "off" positions.

Hydraulic system 30 includes a hydraulic circuit including inlet/outlet conduits 34, 36. Conduit 34 connects to the rod ends of top-operating actuators in the form of cylinders 38a, 38b via fluid conduit 40. Similarly, conduit 36 connects to the head ends of cylinders 38a, 38b via a fluid conduit 42. Cylinders 38a, 38b include output rods 44a, 44b, mounted on pistons 45a, 45b within the cylinders, that are operatively connected to the conventional left and right side linkages (not shown) of top 18 in a well-known manner, such as shown in U.S. Pat. No. 3,608,956 to Adamski, the disclosure of which is incorporated herein by reference.

Figure 3A:
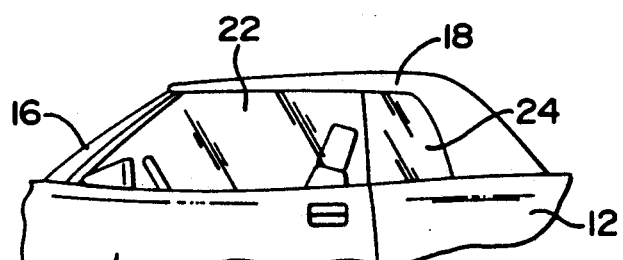
FIGS. 3A, 3B, 3C, 3D, 3E, 3F, 3G and 3H are partial side elevation views of the vehicle of FIG. 1, illustrating a sequence of top and window operation.
Figure 3B:
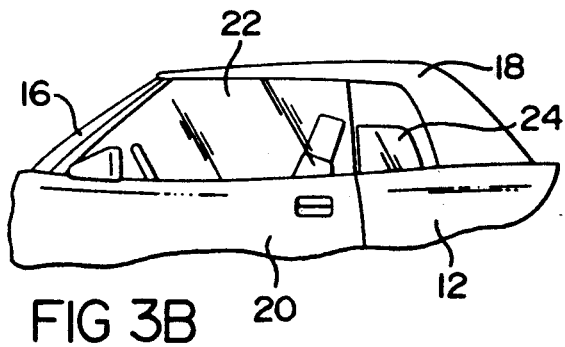
Figure 3C:
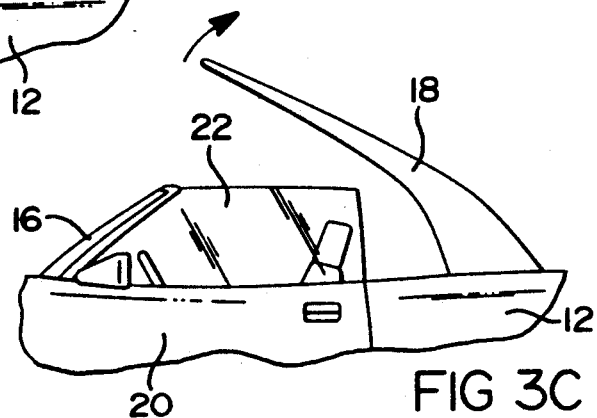
Figure 3D:
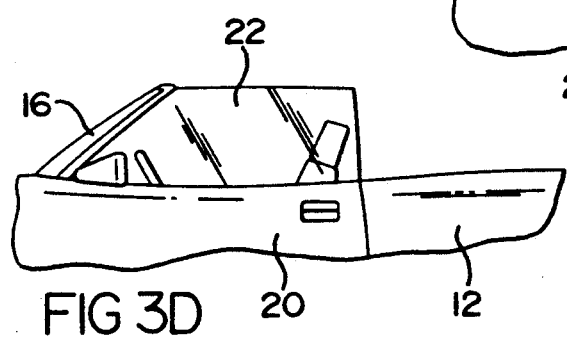
Figure 3E:
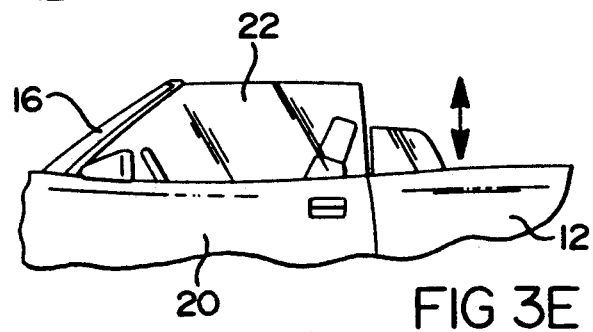
Figure 3F:
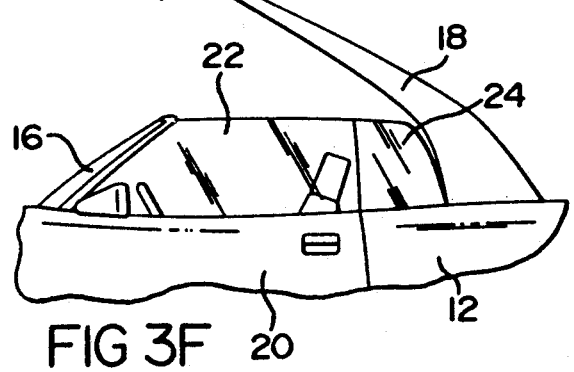
Figure 3G:
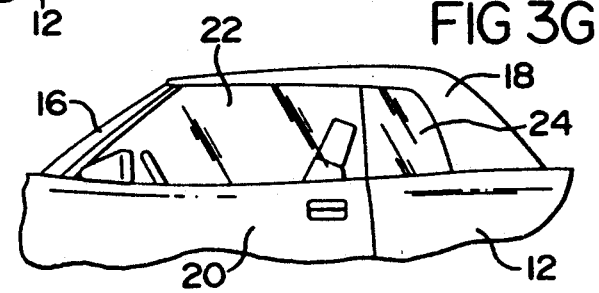
Figure 3H:
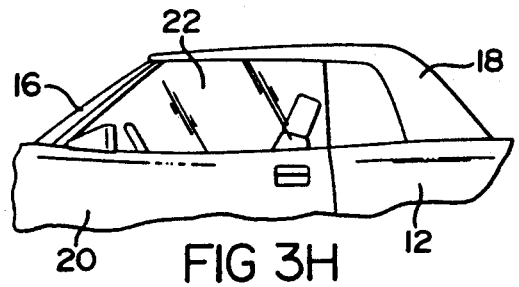

Thus, operation of pump 32 to pressurize conduits 34, 40 will cause retraction of rods 44a, 44b within cylinders 38a, 38b and effect lowering (or, alternatively, raising, dependent on the configuration of the linkage) of the top 18 from the FIGS. 1 and 3A position to that illustrated in FIGS. 3D and 3E. Conversely, pressurization of conduits 36 and 42 will cause extension of rods 44a, 44b to raise top 18 to the position illustrated in Figs. 1, 3A, 3B, 3G and 3H. This operation is conventional and is detailed in the aforementioned Adamski patent.

Referring again to FIGS. 1 and 2, a pair of hydraulic window actuators in the form of cylinders 50a, 50b have respective output rods 52a, 52b, mounted on pistons 53a, 53b, that are connected to the quarter windows 24 such that extension of the rods 52a, 52b raise the windows to the FIGS. 1 and 3A position. Conversely, retraction of rods 52a, 52b lowers windows 24 within vehicle body 12, as shown in sequence FIGS. 3A-3B-3C.

The rod ends of cylinders 50a, 50b are connected to pump 32 in parallel with the rod ends of cylinders 38a, 38b via fluid conduits 54, 56, as illustrated. Similarly, the head ends of cylinders 50a, 50b are connected to pump 32 in conduits 58 and 60.

In operation, movement of switch 33 to "up" position will cause pump 32 to pressurize the head ends of cylinders 38a, 38b. The head ends of cylinders 50a, 50 will also be pressurized so that the quarter windows 24 and the top 18 will all be raised during the same cycle of operation. Similarly, movement of switch 33 to "down" position will pressurize the rod ends of cylinders 38a, 38b and 50a, 50b to lower top 18 and windows 24 during the same cycle of operation, as shown in the sequence 3B-3C-3D.

The sequence of operation of the windows 24 and the top 18 depends upon the relationship between the forces required to raise the top and to raise the windows and the effective operating areas of the pistons 45a, 45b and 53a, 53b. It is desirable to design the hydraulic system 30 to fully move quarter windows 24 before any movement of top 18 occurs. This will enable the quarter windows to be raised and lowered when the top is in raised or lowered position via selective actuation of switch 33 to operate hydraulic system 30, as will now be described.

In an exemplary convertible top, the breakout force required to initiate top raising is 1200 lbs. If the hydraulic cylinder pistons 38a, 38b each have an effective area of 2.0 in.$^2$, a pressure of 300 p.s.i. is required to initiate top raising. To assure that the quarter windows are raised prior to initial top movement, pressure to move the windows is established at 50 p.s.i. If each window requires 20 lbs. to raise, each of the window cylinder pistons 53a, 53b will have an effective area of 0.40 in.$^2$.

The sequence of operation of top and window movement from fully lowered positions is illustrated in FIGS. 3D-3E-3F-3G. Movement of control switch 33 to "up" position will pressurize conduits 36, 42, 58 and 60 which will extend rods 52a, 52b without moving rods 44a, 44b. As shown in sequence FIGS. 3D-3E-3F, this will raise windows 24 fully without moving the top.

If it is desired to raise the top at this time, switch 33 is held in "up" position. This continues operation of pump 32 so that hydraulic pressure will rise until cylinders 50a, 50b begin extending rods 52a, 52b to raise top 18, as shown in sequence FIGS. 3F-3G. This enables raising of the top and both quarter windows in a single sequential operation simply by moving switch 33 to, and holding it in the "up" position. If switch 33 is released to the "off" position before top movement begins, only windows 24 will be raised. Similarly, windows 24 can be lowered by moving switch 33 to the "down" position to reverse pump 32 and pressurize conduits 34, 40, 54 and 56 and the head ends of all cylinders. This causes rods 52a, 52b to retract, lowering windows 24.

Holding switch 33 in "down" position, continues top, since the pistons of all cylinders are bottomed out. Thus, in top lowered position, quarter windows 24 can be selectively raised and lowered without moving top 18 by merely moving switch 33 to its "up" and "down" positions, as illustrated in FIG. 3E. The breakout force required to initiate lowering movement of top 18 in this example is also 1200 lbs. If the rod ends of all pistons have 75% of the effective area of the head ends, the combined area of pistons 45a, 45b is 3.0 in.². A pressure of 400 p.s.i. will then be required to initiate movement of top 18.

Similarly, window cylinder pistons 53a, 53b will each have an effective area of 0.30 in.². Since gravity assists window lowering, only 10 lbs. of force is needed to lower each window 24. Thus, a pressure of only 33.3 p.s.i. is needed to lower windows 24. As above, cylinder pressurization will completely move windows 24 before top 18 moves.

The sequence of operation of top and window movement out of fully raised positions is illustrated in the sequence FIGS. 3A-3B-3C-3D. When top 18 is raised, it is normally latched to windshield 16 to maintain it in its raised position, shown in FIGS. I and 3A. Subsequent actuation of switch 33 to the "down" position will cause hydraulic system 30 to lower windows 24, as illustrated in the sequence FIGS. 3A-3B-3C.

If switch 33 is held in its "down" position, and top 18 is latched, no top movement can occur. However, if top is unlatched, top 18 will be lowered, as illustrated in sequence FIGS. 3C-3D.

In the top raised position, with the windows 24 lowered, movement of switch 33 to the "up" position will raise windows 24. If switch 33 is held in the "up" position, nothing further will happen, whether top 18 is latched or unlatched, since all cylinder pistons are topped out. Again, windows 24 can be selectively raised and lowered with top 18 raised by moving switch 33 to its "up" and "down" positions, as shown in the sequence FIGS. 3A-3B -3H.

With the top up, however, it is highly desirable to "lock" windows 24 in their raised position to eliminate unintended entry to passenger compartment 14 by forcing windows 24 down. Such action could occur, since a downward force on windows 24 would normally slowly force hydraulic fluid out of the head end of cylinders 50a, 50b.

To prevent forcing windows 24 down, the hydraulic circuit includes valves 62a and 62b in conduits 58 and 60, respectively. Valves 62a and 62b can be any conventional solenoid or other type of valves which are commanded by switch 33 to block conduits 58 and 60 when the switch is in its "off" position. This hydraulically isolates the cylinders 38a and 38b by preventing the inflow/outflow of hydraulic fluid to/from the head ends of the cylinders. Thus, when switch 33 is "off", windows 24 are hydraulically locked against forcible lowering by an external force. While two valves are shown each located at the head end of a cylinder, a centrally-located single valve could be used.

This preferred embodiment has been described in relation to a vehicle having rear quarter windows. Some convertible vehicles in production have no quarter windows. This invention is equally applicable to these vehicles by connecting the window cylinders to the side windows for sequential operation as described above. In this modification, cylinders 50a, 50b can be differently sized to cause the driver's door window to operate sequentially before (preferably) or after operation of the passenger door window. Both would still operate fully before top movement.

Figure 4:
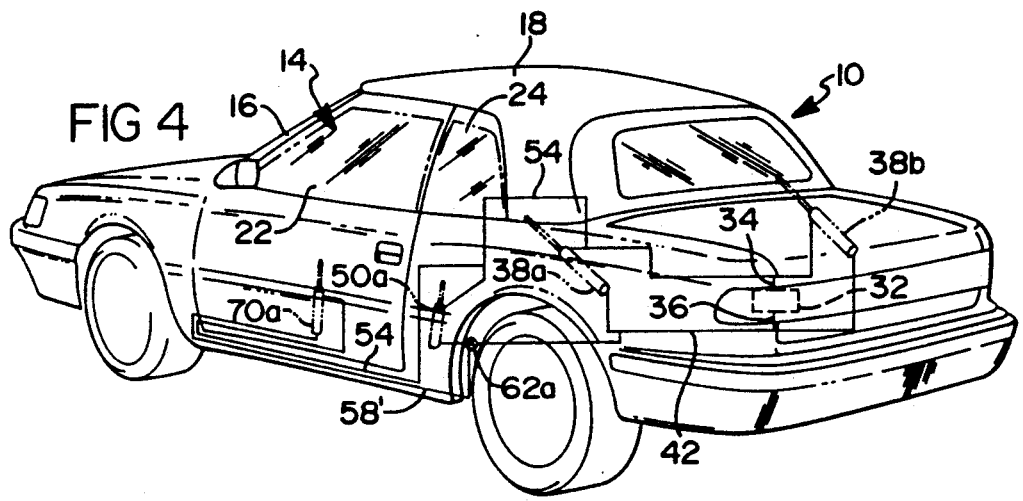
FIG. 4 is a view similar to FIG. 1, but illustrating an alternative embodiment of this invention.
Figure 5:
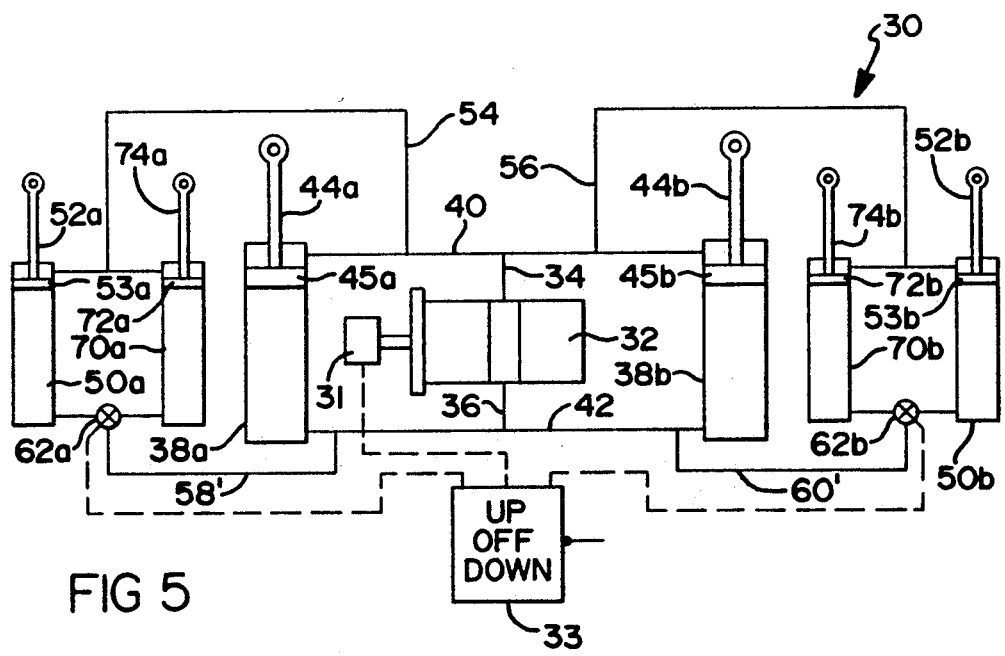
FIG. 5 is a view similar to FIG. 2, but illustrating an alternative embodiment of this invention.

Another embodiment of this invention is shown in FIGS. 4 and 5, in which elements identical to those in FIGS. 1-3 carry the same reference numerals, while those that are similar to, and perform the same function as, those in FIGS. 1-3 carry the same reference numeral, but primed. In this embodiment, hydraulic cylinders 70a, 70b are provided for raising and lowering door side windows 22. Cylinders 70a, 70b contain respective pistons 72a, 72b and output rods 74a, 74b. The hydraulic circuit includes conduits 76a, 76b which connect the head ends of cylinders 70a, 70b through solenoid valves 62a, 62b to conduits 58', 60'. Conduits 78a, 78b connect the rod ends of cylinders operate in concert with cylinders 50a, 50b.

As illustrated, cylinders 50a, 50b are also hydraulically isolated by valves 62a, 62b. Alternatively, if it is desired to locate the valves at the cylinders, four solenoid valves could be provided one for each cylinder.

Operation of this embodiment is similar to that described above, with the following changes. The relationship of cylinders 70a, 70b to each other and to cylinders 50a, 50b can be tailored to produce a desired sequence of operation of windows 22 relative to that of windows 24 through cylinder size selection. By calculating force requirements of the side windows and selecting cylinder size, the side windows 22 can be made to raise and lower simultaneously with, or sequentially before or after, quarter windows 24.

If it is desired to sequence the operation of one side window from another, cylinders 70a, 70b can be sized differently. In a preferred form, the size of cylinders 70a, 70b is chosen to cause left side (driver's) window 22 to raise and lower first, then the right side window—both sequentially before movement of quarter windows 24. This enables the driver to open and close his window without affecting the windows adjacent other passengers. This also enables selective independent movement of the right (passenger's) door window after movement of the driver's window without moving the quarter windows. In this arrangement, all windows would move fully before any top movement.

While only a preferred and alternate embodiments have been illustrated and described, obvious modifications and the following claims. For example, a single, centrally-located solenoid valve could replace the located adjacent the window cylinders.

If it is desired to only prevent window movement when the top is raised, control of isolation valves 62a and 62b could be moved from switch 33 to a windshield header-mounted switch actuated by top latching. Other arrangements are obviously possible.

Also, valves could be added in a well-known manner to cause any desired sequence of window and top operation, although this would complicate the hydraulic system. A feature of this invention is its simplicity in using a single hydraulic power source and a single control switch to control operation of the top and the windows.

I claim:

1. In a convertible vehicle having a body with a passenger compartment, a top mounted on the body for movement between a raised position covering the passenger compartment and a lowered position opening the passenger compartment, and a window mounted on the body for movement between raised and lowered positions, a hydraulic system including a hydraulic pressure fluid source and a first hydraulic actuator for raising and lowering the top, characterized by a second hydraulic actuator operatively connected to the window and operable to raise and lower the window with less hydraulic pressure than required to raise and lower the top, and a hydraulic circuit connecting said actuators in parallel so that the hydraulic system is operable to sequentially raise the window and then the top, and to sequentially lower the window and then the top.

2. The hydraulic system of claim further characterized by including valve means operable in the top raised position to hydraulically isolate the window actuator to prevent lowering of the window.

3. The hydraulic system of claim 1, further characterized by including valve means selectively operable to hydraulically isolate the window actuator to prevent movement of the window.

4. The hydraulic system of claim 3, further characterized by the valve means having a first position preventing movement of the window by hydraulically isolating the window actuator from the pressure fluid source and a second position enabling movement of the window by connecting the window actuator with the pressure fluid source, and including a control having an "up" position for moving the valve means to second position and operating the system to raise the window and top, an "off" position for moving the valve means to first position and halting operation of the pressure fluid source, and a "down" position for moving the valve means to said second position and operating the pressure fluid source to lower the window and top, whereby the window may be lowered and raised when the top s locked in raised position by moving the control to respective "down" and "up" positions, and the window is hydraulically locked in any selected position when the control is moved to "off" position.

5. In a convertible vehicle having a body with a passenger compartment, a top mounted on the body for movement between a raised position covering the passenger compartment and a lowered position opening the passenger compartment, lock means for locking the top in raised position, and first and second windows mounted on the body for movement between raised and lowered positions, a hydraulic system including a hydraulic pressure fluid source and a hydraulic top actuator for raising and lowering the top, characterized by first and second hydraulic window actuators operatively connected to the windows and operable to raise and lower the windows with less hydraulic pressure than required to raise and lower the top, and a hydraulic circuit connecting said actuators in parallel to the pressure fluid source so that the hydraulic system is operable to sequentially raise the windows and hen the top.

6. The hydraulic system of claim 5, further characterized by including valve means in the hydraulic circuit operable in the top raised position to hydraulically isolate the window actuators from the pressure fluid source to prevent lowering of the windows.

7. The hydraulic system of claim 5, further characterized by including valve means in the hydraulic circuit selectively operable to hydraulically isolate the window actuators from the pressure fluid source to prevent movement of the windows.

8. The hydraulic system of claim 7, further characterized by the valve means having a first position preventing movement of the windows by hydraulically isolating the window actuators from the pressure fluid source and a second position enabling movement of the windows by connecting the window actuators with the pressure fluid source, and including a control having an "up" position for moving the valve means to second position and operating the pressure fluid source to raise the windows and top, an "off" position for moving the valve means to first position and halting operation of the pressure fluid source, and a "down" position for moving the valve means to said second position and operating the pressure fluid source to lower the windows and top, whereby the windows may be lowered and raised when the top is locked in raised position by moving the control to respective "down" and "up" positions, and the windows are hydraulically locked in any selected position when the control is moved to "off" position.

9. The hydraulic system of claim 5, further characterized by the vehicle having two passenger access doors, and said windows each being mounted in a vehicle door.

10. The hydraulic system of claim 5, further characterized by the vehicle having two passenger access doors, said windows each being mounted in a vehicle door, and the first cylinder being sized to raise and lower one of the windows with less hydraulic pressure than required to raise and lower the other window, thus sequentially operating one of the windows before operation of the other window.

11. The hydraulic system of claim 9, further characterized by including third and fourth windows mounted on the body rearwardly adjacent the vehicle doors for movement between raised and lowered positions, third and fourth hydraulic window actuators operatively connected to the third and fourth windows and operable to raise and lower the windows with less hydraulic pressure than required to raise and lower the top, and said hydraulic circuit connecting all of said actuators in parallel to the pressure fluid source so that the hydraulic system is operable to sequentially raise all four windows and then the top, and to sequentially lower all four of the windows and then the top.

12. The hydraulic system of claim 11, further characterized by including valve means in the hydraulic circuit selectively operable to hydraulically isolate the window actuators from the pressure fluid source to prevent movement of the windows.

13. The hydraulic system of claim 12, further characterized by the valve means having a first position preventing movement of the windows by hydraulically isolating he window actuators from the pressure fluid source and a second position enabling movement of the windows by connecting the window actuators with the pressure fluid source, and including a control having an "up" position for moving the valve means to second position and operating the pressure fluid source to raise the windows and top, an "off" position for moving the valve means to first position and halting operation of the pressure fluid source, and a "down" position for moving the valve means to said second position and operating the pressure fluid source to lower the windows and top, whereby the windows may be lowered and raised when the top is locked in raised position by moving the control to respective "down" and "up" positions, and the windows are hydraulically locked in any selected position when the control is moved to "off" position.

14. The hydraulic system of claim 11, further characterized by the first and second cylinders being sized to raise and lower the door windows with less hydraulic pressure than required by the third and fourth cylinders to raise the third and fourth windows, thus sequentially raising and lowering the door windows before raising and lowering the third and fourth windows.

15. The hydraulic system of claim 4, further characterized by the first cylinder being sized to raise and lower one of the door windows with less hydraulic pressure than required to raise and lower the other door window, thus sequentially raising and lowering one of the door windows before raising and lowering the other door window.

16. The hydraulic system of claim 11, further characterized by all of the cylinders being sized to raise and lower all of the windows with the same hydraulic pressure such that all windows raise and lower substantially together, and before movement of the top.

17. In a convertible vehicle having a body with a passenger compartment, two passenger access doors, a top mounted on the body for movement between a raised position covering the passenger compartment and a lowered position opening the passenger compartment, lock means for locking the top in raised position, and first and second windows mounted in the doors for movement between raised and lowered positions, and third and fourth windows mounted on the body rearwardly adjacent the vehicle doors for movement between raised and lowered positions, a hydraulic system including a hydraulic pressure fluid source and a pair of hydraulic top cylinders for raising and lowering the top, characterized by hydraulic window cylinders operatively connected to each of the windows and operable to raise and lower the windows with less hydraulic pressure than required to raise and lower the top, a hydraulic circuit connecting all of said cylinders in parallel to the pressure fluid source so that the hydraulic system is operable to sequentially raise all four windows and then the top, and to sequentially lower all four of the windows and then the top, at least one valve in the hydraulic circuit selectively operable to hydraulically isolate the window actuators from the pressure fluid source to prevent movement of the windows, each valve having a first position preventing movement of the windows by hydraulically isolating the window actuators from the pressure fluid source and a second position enabling movement of the windows by connecting the window actuators with the pressure fluid source, and a control having an "up" position for moving each valve to second position and operating the pressure fluid source to raise the windows and top, an "off" position for moving the valve means to first position and halting operation of the pressure fluid source, and a "down" position for moving each valve to said second position and operating the pressure fluid source to lower the windows and top, whereby the windows may be lowered and raised when the top is locked in raised position by moving the control to respective "down" and "up" positions, and the windows are hydraulically locked in any selected position when the control is moved to "off" position.

* * * * *

UNITED STATES PATENT AND TRADEMARK OFFICE
CERTIFICATE OF CORRECTION

PATENT NO. : 5,110,175
DATED : May 5, 1992
INVENTOR(S) : Roderick C. Fischbach It is certified that error appears in the above-identified patent and that said Letters Patent is hereby corrected as shown below:

In the CLAIMS:

Col. 7, line 9, the reference number of the claim has been omitted and should read --2. The hydraulic system of claim 1,--.

Col. 7, line 35, "top s locked" should read --top is locked--.

Col. 7, line 60, "and hen" should read --and then--.

Col. 9, line 21, "claim 4" should read --claim 14--.

Signed and Sealed this

Twenty-second Day of June, 1993

Attest:

MICHAEL K. KIRK

*Attesting Officer*    Acting Commissioner of Patents and Trademarks